Jan. 3, 1961 F. E. HOECKER 2,967,241
METHOD FOR MEASURING AND REPRESENTING THE CONFIGURATION
OF FIELDS OF HIGH-ENERGY RADIATION
Filed Aug. 16, 1954
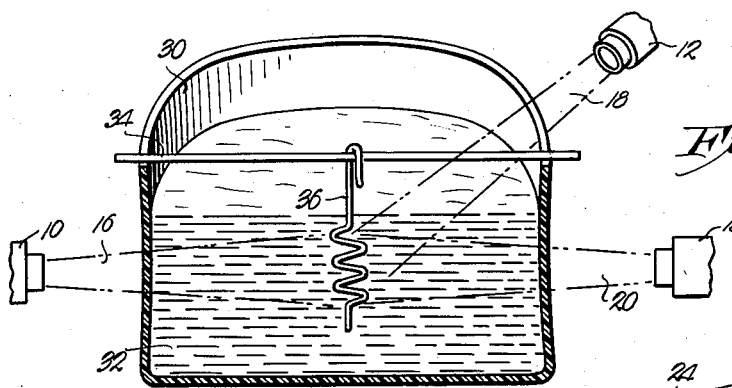
Fig. 1.
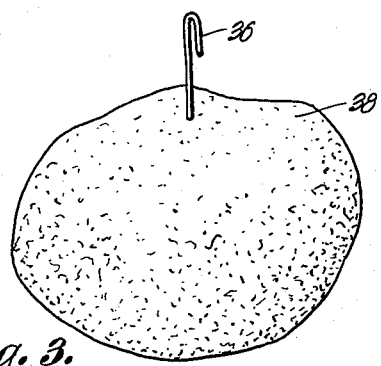
Fig. 3.
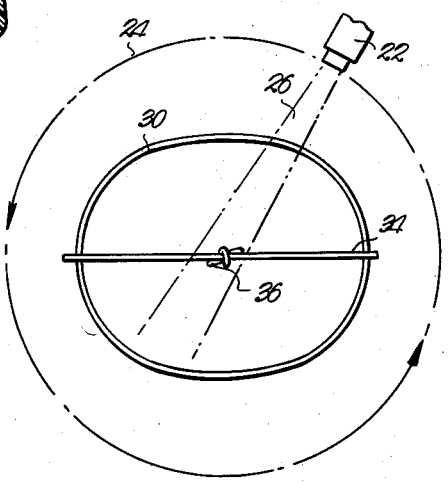
Fig. 2.
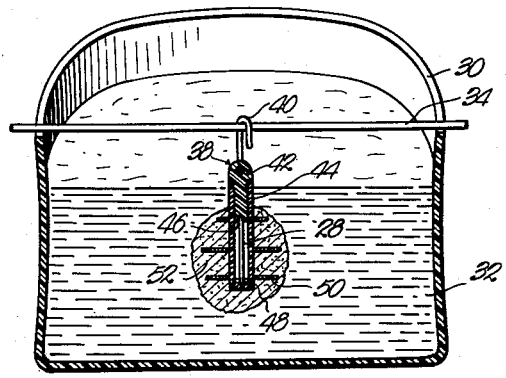
Fig. 4.
INVENTOR.
Frank E. Hoecker
BY
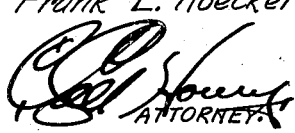
ATTORNEY.

United States Patent Office 2,967,241
Patented Jan. 3, 1961

2,967,241

METHOD FOR MEASURING AND REPRESENTING THE CONFIGURATION OF FIELDS OF HIGH-ENERGY RADIATION

Frank E. Hoecker, 1503 Haskell, Lawrence, Kans.

Filed Aug. 16, 1954, Ser. No. 450,062

9 Claims. (Cl. 250—83)

This invention relates to therapeutic procedures and, more particularly, to an improved method and apparatus for predicting in advance the irradiating effect upon a portion of the human body of a field of high-energy radiation emanating from a source or sources thereof of predetermined intensity and disposition relative to said portion of the human body.

The administration of X rays, gamma rays and other radiations of similarly short wavelength in connection with therapeutic procedures has in the past involved either guesswork or computations of a most laborious nature in predicting the configuration of an internal portion of a human body which will be irradiated by given sources in predetermined relative disposition, as well as in predicting the strength of the field of radiations to which said portion of the human body will be subjected by exposure to radiations from said sources so disposed.

Accordingly, it is the primary object of this invention to provide a method and apparatus for utilizing inanimate materials which are sensitive to radiations of the wavelength in question and capable of undergoing observable, physical transformation when subjected to radiations of given strength for a given period of time to present graphical representations in the form of three-dimensional models of configuration and relative size corresponding to that portion of a human body which would be irradiated in predetermined amount during a predetermined period of time when subjected to radiations from the same sources identically disposed.

Another important object of this invention is to provide a method and apparatus capable of utilizing inanimate materials to present a three-dimensional model of configuration corresponding to the incidence within a given space of a field of radiations of wavelength shorter than two Angstrom units and of intensity in excess of a predetermined level.

Other important objects of this invention will be made clear or become apparent as the following description of the invention progresses. In the accompanying drawing:

Figure 1 is a view, partially in perspective and partially in section, of one form of apparatus contemplated by this invention, illustrating the use thereof in connection with a number of fixed sources of radiations;

Fig. 2 is a top plan view of said form of apparatus contemplated by this invention, illustrating its use in connection with a source of radiations moving in a predetermined orbit;

Fig. 3 is a perspective view of a three-dimensional, irradiation field model such as is produced by the method of this invention; and Fig. 4 is a view, partially in perspective and partially in section, of another form of apparatus contemplated by this invention, illustrating its use in connection with a radioactive needle or the like.

Therapeutic procedures may use several different methods of disposing and directing sources of high-energy radiations in order to irradiate a predetermined internal portion of a human body to be treated. In Fig. 1 are illustrated a number of stationary, external sources of radiations 10, 12 and 14. Sources 10, 12 and 14 may be X-ray machines or the like disposed in predetermined, fixed relationship to each other to direct their respective beams 16, 18 and 20 for intersection of the latter to present a field of radiations throughout their zone of intersection of greater intensity than the radiations of any single one of said beams 16, 18 or 20. Since in the treatment of certain diseases it is desirable to irradiate a given internal portion of a human body with a field of radiations sufficient in strength to kill the tissue thereof, but since in so doing it is not desirable to use any one beam of radiations of sufficient strength to kill all tissue between the surface of the human body and the internal portion thereof desired to be destroyed, it will be apparent that the above described system of utilizing the field of intersection of a plurality of radiating beams insufficient by itself to destroy human tissue is adapted to attain the desired objectives. Similarly, however, it will also be apparent that since the strength of radiations in each beam decreases inversely as a function of distance from the source, and since several sources may necessarily have to be used in complex, relative disposition, the task of predicting in advance the exact configuration of the internal portion of a human body which will be irradiated to the point of tissue destruction would involve mathematical calculations of a most complicated and laborious nature.

Another system used to achieve a field of radiation of tissue destroying strength within only a predetermined, internal portion of a human body is illustrated in Fig. 2 and involves the use of one or more radiation sources 22 each undergoing continuous rotation at a predetermined speed through a preselected orbit 24 adapted to maintain a radiation beam 26 from each source 22 so directed as to continuously pass through a given volume in space while only intermittently passing through adjacent volumes in space. By such system the volume in space through which the beam of radiations 26 continuously pass, though entering the same from a continually changing direction, is subjected to the cumulative effects of radiation from the beam 26 much more quickly than the space surrounding such field of continuous imposition.

In Fig. 4 is illustrated a radioactive needle 28, such as is used in another system of therapeutic treatment where such a needle 28 is inserted internally of the human body within a portion of the latter to be irradiated to a point of tissue destruction.

Having recognized the above mentioned systems by which sources of high-energy radiations are typically employed in therapeutic procedures, the method and apparatus of the present invention may be conveniently described with reference thereto.

It has been discovered that certain inanimate, organic materials, particularly certain resins and most if not all monomers, have the property, when in a homogenized, aqueous solution of solidifying to present a self-sustaining mass wherever the same is subjected for a predetermined period of time to X-rays, gamma rays or similar radiations of wavelength less than two Angstrom units which are in excess of a predetermined intensity. Specific materials from such class, which have been found to possess such property in connection with radiation parameters of wavelength and intensity normally utilized in therapeutic procedures include styrene monomer, glycerol resin, glyptol resin and polyester resin, the latter being available on the market from Ward Scientific Establishment, Rochester, New York, under the trade name Bio-Plastic. Although the strength of a solution of any of such materials or a suitable mixture thereof may be varied to change the radiation parameter under which solidification will occur, a suitable proportion for each of the above mentioned substances has been found to be 75% by weight of the resin or monomeric substance and 25% by weight of distilled water. As above noted, such solution is preferably highly homogenized by the beating of air thereinto.

For each of said substances having the above noted property of undergoing physical transformation from the liquid state to the solid state under the influence of a radiation field of predetermined intensity for a predetermined period of time there may be computed a "tissue equivalent" factor relating the parameters under which such substance undergoes solidification to the radiation parameters under which human tissue absorbs sufficient radiations to be damaged or destroyed. Therapeutic procedures for the destruction of human tissue normally involve irradiation thereof in an amount measurable at between 4,000 and 10,000 Roentgen units. By comparison, a solution of polyester resin in the above mentioned proportions will require about 40,000 Roentgen units for solidification to a self-sustaining state of mass. Thus, the "tissue equivalent" factor of such a solution of polyester resin to a treatment of human tissue intended to irradiate the latter to the extent of 10,000 Roentgen units would be approximately 4 to 1. In other words, irradiation of a field within a body of solution of polyester resin with radiations with certain sources thereof for a given period of time will present a self-sustaining solidified mass of a configuration and size corresponding to the internal portion of a human body which would be irradiated to the extent of 10,000 Roentgen units by the same sources identically disposed for a period of time one-fourth as long as that during which the polyester resin solution was subjected to said radiations.

It will, therefore, be clear that a body of a solution as above described of one of the above mentioned substances having the property of undergoing solidification when subjected to radiation may be disposed within a space relative to given sources of radiations complying to the space which a human body will occupy during treatment and may there be subjected to radiations from such sources for an easily calculable period of time to present a three-dimensional model of that internal portion of the human body which will be irradiated in predetermined amount during the treatment to follow.

If the method contemplated by this invention has not already been made entirely clear, it is believed that same will become readily apparent to those skilled in the art from the following description of the preferred forms of apparatus developed for practicing the method.

Referring now to Fig. 1, the numeral 30 illustrates a container formed of material which passes without significant attenuation radiations of the wavelength emanating from sources 10, 12 and 14. Such a material may be either aluminum, certain plastics or other materials well known to those skilled in the art as having the desired characteristics. Container 30 is preferably formed in a shape corresponding to that cross-sectional part of a human body through which beams 16, 18 and 20 are to pass during treatment.

Within container 30 is disposed a body of material 32 having the above mentioned property of undergoing solidification under the influence of radiations, and may consist of a solution as above described of any of the above mentioned substances or some mixture thereof chosen to give a particular "tissue equivalent" factor. Since such body of material will have radiation absorption qualities comparable in accordance with the "tissue equivalent" factor thereof to those of human tissue, the importance of shaping container 30 to correspond to the configuration of the part of a human body through which radiations will pass becomes evident.

A suitable support 34 of any suitable form is provided and depending therefrom is an element 36 which extends downwardly into the body of solidifying material 32 within that zone of the latter which is expected to solidify under the influence of the radiation field presented at the intersection of beams 16, 18 and 20. Element 36 may be of various forms such as a grid or, as illustrated, a rod having a serpentine portion adapted to support the mass of body 32 which will solidify against shifting during the time that solidification is progressing. Element 36 is also preferably formed of aluminum or other suitable material which will not substantially attenuate the passage of radiations therethrough, it being noted that the materials used for element 36 and container 30 should also be of a nature not subject to chemical reaction with the material of body 32.

In Fig. 2 the same pieces of apparatus are illustrated in top plan view and similarly numbered.

In Fig. 3 is illustrated a typical mass 38 of solidified material 32 formed upon an element 36, it being significant that such a mass 38 may be removed from the container 30 for measurement and study by a physician. It is also noted that mass 38 may be subjected to any suitable catalyst upon removal from container 30 for the purpose of hardening the outer surface thereof to facilitate handling, if necessary. The nature of the catalyst to be used will depend upon the particular material 32 involved and will be apparent to those skilled in the art.

In Fig. 4 is illustrated in the place of element 36 an assembly generally designated 38 which includes a hook 40 for securing over support 34, a partially externally threaded male cap 42 and an internally threaded hollow cup 44 screwed upon and depending from cap 42. Cap 42 and cup 44 are respectively provided with opposed cavities 46 and 48 adapted to receive and hold radioactive needle 28 in fixed position within cup 44. Cup 44 may have a roughened outer surface and may be additionally provided with a number of radially extending lateral projections 50 for supporting a mass 52 of material 32 as the same solidifies during subjection to radiation from needle 28. As will be evident, cap 42 may be removed from cup 44 and needle 28 removed from the latter for later use within the portion of a human body to be treated, all without disturbing or destroying the solidified mass 52 formed upon cup 44 and representative of the configuration of the field of radiations from needle 28. Cup 44, like element 36, is preferably formed of a material such as aluminum which is adapted to pass radiations of the wavelength in question with significant attenuation.

It can be appreciated that the quantity of radiation which is directed into one sample of the polymerizable monomer is equal to the product of the intensity level of the radiation and the exposure time. This product is usually denoted as the dose level or dosage.

It will now be apparent that the method and apparatus of this invention make possible a greater accuracy in connection with therapeutic procedures involving the use of high-energy radiation than have heretofore been possible without expert and laborious mathematical calculation, if at all.

Moreover, it will be obvious that certain minor changes and modifications may be made in the method or apparatus of this invention without departing from the true spirit and intention thereof. Accordingly, it is desired to be limited only by the scope of the appended claims.

Having thus described the invention what is claimed as new and desired to be secured by Letters Patent is:

1. The method of ascertaining the three-dimensional zone subjected to a predetermined radiation dosage when radiations are directed through a space including said zone along a plurality of intersecting paths for a period of time comprising the steps of disposing within said space a body of liquid material characterized by the property of undergoing transformation to the solid physical state at those portions thereof which are subjected to said predetermined dosage of radiations; passing radiations through at least portions of said space along said paths for said period of time until a solidified, three-dimensional model of said zone of lesser dimensions than said space is produced within said body of liquid; and supporting that portion of said material which solidifies against shifting as the solidification thereof progresses during said period.

2. In the method as set forth in claim 1, wherein said material includes a monomeric substance characterized by susceptibility to polymerization under the influence of radiations of said dosage.

3. In the method as set forth in claim 2, wherein said substance is a styrene monomer.

4. In the method as set forth in claim 2, wherein said substance is a polyester resin.

5. In the method as set forth in claim 2, wherein said substance is a glycerol resin.

6. In the method as set forth in claim 2, wherein said substance is a glyptol resin.

7. In the method as set forth in claim 1, wherein the intensity of said radiations and the duration of said period are predetermined.

8. In the method as set forth in claim 1, wherein said radiations are directed into said space simultaneously and continuously along each of said paths.

9. In the method as set forth in claim 1, wherein said radiations are directed into said space along said paths successively.

References Cited in the file of this patent

UNITED STATES PATENTS

| | | |
|---|---|---|
| 1,241,738 | Klatte et al. | Oct. 2, 1917 |
| 2,524,862 | White | Oct. 10, 1950 |
| 2,579,243 | Reid | Dec. 18, 1951 |
| 2,694,335 | Albright et al. | Nov. 16, 1954 |
| 2,740,899 | Cummings | Apr. 3, 1956 |

OTHER REFERENCES

Effect of Gamma Radiation on Certain Rubbers and Plastics, by John W. Ryan, from Nucleonics, vol. II, No. 8, August 1953; pages 13 to 15.

How Radiation Affects Important Materials, by Dr. Samuel S. Jones, from General Electric Review, July 1954; pages 7 to 11.